(12) United States Patent
Sidiropoulos et al.

(10) Patent No.: US 8,155,236 B1
(45) Date of Patent: *Apr. 10, 2012

(54) METHODS AND APPARATUS FOR CLOCK AND DATA RECOVERY USING TRANSMISSION LINES

(75) Inventors: Stefanos Sidiropoulos, Palo Alto, CA (US); Haw-Jyh Liaw, Fremont, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 1404 days.

This patent is subject to a terminal disclaimer.

(21) Appl. No.: 10/176,495

(22) Filed: Jun. 21, 2002

(51) Int. Cl.
*H04L 25/34* (2006.01)

(52) U.S. Cl. ............ 375/288; 375/293; 375/287

(58) Field of Classification Search .......... 375/316, 375/242, 348, 349, 326, 288, 290, 371, 325, 375/257, 355, 362, 377, 229, 363, 375, 318, 375/226, 227, 342; 333/164; 332/103, 146; 341/71, 164; 328/55, 72

See application file for complete search history.

(56) References Cited

U.S. PATENT DOCUMENTS

| | | | |
|---|---|---|---|
| 3,601,543 A * | 8/1971 | Maniere et al. | 370/438 |
| 4,021,757 A | 5/1977 | Nossen | |
| 4,110,558 A * | 8/1978 | Kageyama et al. | 375/357 |
| 4,314,212 A * | 2/1982 | Gradl | 333/20 |
| 4,507,629 A * | 3/1985 | Frank | 333/164 |
| 4,586,010 A * | 4/1986 | Linnenbrink | 333/165 |
| 4,621,242 A * | 11/1986 | Theall et al. | 333/17.3 |
| 5,124,670 A | 6/1992 | Lawton | |
| 5,365,547 A * | 11/1994 | Marinaro | 375/259 |
| 5,430,773 A * | 7/1995 | Marbot | 375/373 |
| 5,471,162 A * | 11/1995 | McEwan | 327/92 |
| 5,488,627 A | 1/1996 | Hardin et al. | |
| 5,519,342 A * | 5/1996 | McEwan | 327/94 |
| 5,559,474 A | 9/1996 | Matsumoto et al. | |
| 5,712,583 A | 1/1998 | Frankeny | |
| 5,712,882 A * | 1/1998 | Miller | 375/356 |
| 5,774,084 A | 6/1998 | Brombaugh et al. | |
| 5,864,250 A | 1/1999 | Deng | |
| 6,125,157 A | 9/2000 | Donnelly et al. | |

(Continued)

OTHER PUBLICATIONS

U.S. Appl. No. 12/987,861, filed Jan. 10, 2011, Sidiropoulos et al., Office Action dated Jun. 8, 2011.

(Continued)

*Primary Examiner* — Khanh C Tran
*Assistant Examiner* — Qutbuddin Ghulamali
(74) *Attorney, Agent, or Firm* — Stattler-Suh PC

(57) ABSTRACT

A data receiver circuit includes a transmission line to generate the appropriate timing for clock and data recovery. The transmission line receives a reference signal, and propagates the reference signal through at least two segments of predetermined lengths. The transmission line is configured with a first tab to extract, from the first predetermined length, a first delayed signal, and a second tab to extract, from the second predetermined length, a second delayed signal. A sampling circuit generates samples, at a first time period, from an input signal and the first delayed signal. The sampling circuit also generates samples, at a second time period, from the input signal and the second delayed signal. A capacitance control device to adjust the capacitance of the transmission line is disclosed. The data receiver circuit and the transmission line may be both fabricated on an integrated circuit, or the transmission line may be implemented external to the integrated circuit chip, such as on a package housing of the integrated circuit chip or on a printed circuit board for which the integrated circuit chip is mounted.

16 Claims, 8 Drawing Sheets

U.S. PATENT DOCUMENTS

| | | | |
|---|---|---|---|
| 6,167,467 A * | 12/2000 | Itoh et al. | 710/33 |
| 6,226,332 B1 * | 5/2001 | Agazzi et al. | 375/288 |
| 6,242,990 B1 * | 6/2001 | Sokolov | 332/103 |
| 6,285,726 B1 | 9/2001 | Gaudet | |
| 6,317,008 B1 | 11/2001 | Gabara | |
| 6,466,098 B2 | 10/2002 | Pickering | |
| 6,535,043 B2 | 3/2003 | Chen | |
| 6,570,946 B1 | 5/2003 | Homol et al. | |
| 6,631,144 B1 | 10/2003 | Johansen | |
| 6,650,157 B2 | 11/2003 | Amick et al. | |
| 6,674,824 B1 | 1/2004 | Chiueh et al. | |
| 6,693,496 B1 | 2/2004 | Lebouleux | |
| 6,828,864 B2 | 12/2004 | Maxim et al. | |
| 6,901,126 B1 | 5/2005 | Gu | |
| 6,927,611 B2 | 8/2005 | Rhee et al. | |
| 6,961,546 B1 * | 11/2005 | Rofougaran et al. | 455/118 |
| 6,967,513 B1 | 11/2005 | Balboni | |
| 6,999,543 B1 | 2/2006 | Trinh et al. | |
| 7,005,885 B1 | 2/2006 | Feldman | 326/16 |
| 7,054,404 B2 | 5/2006 | Saeki | |
| 7,065,666 B2 | 6/2006 | Janzen | |
| 7,078,946 B2 | 7/2006 | Van der Valk et al. | |
| 7,088,534 B2 | 8/2006 | Sutardja | |
| 7,089,444 B1 | 8/2006 | Asaduzzaman et al. | |
| 7,161,443 B2 | 1/2007 | Chen | |
| 7,162,002 B2 | 1/2007 | Chen et al. | |
| 7,233,170 B2 | 6/2007 | Becker et al. | |
| 7,317,360 B2 | 1/2008 | Keaveney et al. | |
| 7,323,916 B1 | 1/2008 | Sidiropoulos et al. | 327/156 |
| 7,432,750 B1 | 10/2008 | Sidiropoulos et al. | 327/156 |
| 7,436,229 B2 | 10/2008 | Sidiropoulos et al. | 327/157 |
| 7,443,215 B1 | 10/2008 | Sidiropoulos | 327/156 |
| 7,532,697 B1 | 5/2009 | Sidiropoulos et al. | 375/376 |
| 7,679,345 B1 | 3/2010 | Verma et al. | |
| 2001/0043649 A1 * | 11/2001 | Farjad-Rad | 375/229 |
| 2003/0081709 A1 * | 5/2003 | Ngo et al. | 375/362 |
| 2003/0086501 A1 * | 5/2003 | Dreps et al. | 375/257 |
| 2003/0091139 A1 | 5/2003 | Cao | |
| 2003/0138008 A1 | 7/2003 | Riaziat et al. | |
| 2003/0161430 A1 | 8/2003 | Sou | |
| 2003/0182481 A1 * | 9/2003 | Schoenborn | 710/100 |
| 2004/0202266 A1 | 10/2004 | Gregorius et al. | |
| 2005/0111843 A1 | 5/2005 | Takeuchi et al. | |
| 2006/0023602 A1 | 2/2006 | Rauschmayers | |
| 2008/0049850 A1 | 2/2008 | Sidiropoulos et al. | 375/316 |
| 2008/0260071 A1 | 10/2008 | Sidiropoulos et al. | 375/354 |
| 2010/0164445 A1 | 7/2010 | Verma et al. | |

OTHER PUBLICATIONS

U.S. Appl. No. 11/781,712, filed Jul. 23, 2007, Sidiropoulos, et al.
U.S. Appl. No. 12/728,101, filed Mar. 19, 2010, Loinaz, Marc J.
U.S. Appl. No. 12/728,113, filed Mar. 19, 2010, Loinaz et al.
U.S. Appl. No. 12/828,125, filed Jun. 30, 2010, Cirit, Halil.
U.S. Appl. No. 12/828,153, filed Jun. 30, 2010, Cirit, Halil.
Sidiropoulos et al., Adaptive Bandwidth DLLs and PLLs using Regulated Supply CMOS Buffers, 2000 Symposium on VLSI Circuits Digest of Technical Papers.
Mansuri et al., A Low-Power Low-Jitter Adaptive-Bandwidth PLL and Clock Buffer, ISSCC 2003/Session 24/Clock Generation/Paper 24.5, ISSCC 2003/Feb. 12, 2003/Salon 8/ 3:45PM, 2003 IEEE International Solid-State Circuits Conference.
Mansuri et al. Jitter Optimization Based on Phase-Locked Loop Design Parameters, IEEE Journal of Solid-State Circuits, vol. 37, No. 11, Nov. 2002.
Maxim et al., A Low-Jitter 125-1250-MHz Process-Independent and Ripple-Poleless 0.18-μm CMOS PLL Based on a Sample-Reset Loop Filter, IEEE Journal of Solid-State Circuits, vol. 36, No. 11, Nov. 2001.
Maneatis, Self-Biased High-Bandwidth Low-Jitter 1-to-4096 Multiplier Clock Generator PLL, IEEE Journal of Solid-State Circuits, vol. 38, No. 11, Nov. 2003.
Sidiropoulos, A Semidigital Dual Delay-Locked Loop, IEEE Journal of Solid-State Circuits, vol. 32, No. 11, Nov. 1997.
U.S. Appl. No. 12/728,129, filed Mar. 19, 2010, Liu et al.
U.S. Appl. No. 12/185,750, filed Aug. 4, 2008, Stefanos Sidiropoulos.
U.S. Appl. No. 11/930,978, filed Oct. 31, 2007, Sidiropoulous et al., Office Action dated Mar. 18, 2011.

* cited by examiner

METHODS AND APPARATUS FOR CLOCK AND DATA RECOVERY USING TRANSMISSION LINES

BACKGROUND OF THE INVENTION

1. Field of the Invention

The present invention is directed toward the field of data communications, and more particularly toward a high-speed clock and data recovery circuit.

2. Art Background

Electronic circuits utilize serial data transmission to transmit data among one or more circuits. In general, serial data transmission involves transmitting bits in a single bit stream at a predetermined data rate. The data rate is expressed as the number of bits transmitted per second ("bps"). Typically, to transfer data between circuits, the sending circuit employs a transmitter that modulates and sends data using a local clock. The local clock provides the timing for the bit rate. The receiving circuit employs a receiver to recover the data, and in some cases, the clock. The receiver circuit recovers the serial bit stream of data by sampling the bit stream at the specified data rate.

Techniques have been developed in an attempt to maximize the efficiency of serial data transfer. One such technique recovers the data at the receiver without receiving the sampling clock from the transmitter (i.e., a separate clock is generated at the receiver). Most serial data links that utilize this technique "over sample" the data to recover clock and data. In one over sampling method, the incoming data is first sampled at the bit cycle transition point to determine whether the phase of the clock at the receiver leads or lags the phase of the bit transitions in the serial bit stream. In addition, the serial bit stream is sampled at the center of the bit cycle to determine the state or value of the data for that bit cycle. If the semiconductor technology that implements the receiver is fast enough, the rate of the sampling clock at the receiver is equal to the bit rate. For example, if the bit rate for a serial data link is 40 giga bits per second, then the clock used to sample the data may have a frequency of 40 gigahertz ("GHz").

Techniques have been developed to generate sampling clocks at the receiver if the underlying semiconductor technology is not sufficient to generate clock speeds at the serial data rate. Specifically, multiple clocks with different phases are generated to sample the serial bit stream within a single clock cycle of the data rate. This technique of altering the phase of the clock relaxes the requirement to generate high-speed clocks on-chip. Although this technique reduces requisite maximum clock frequency, it still requires that the spacing of the clock edges for the multiple clock phases have a separation equal to ½ or less of the transmission bit time. If the receiver samples the bit stream four times per bit cycle, then the clock edges must be generated at the rate of ¼ of the transmission bit rate.

In high-speed serial links, one half the bit rate may equal a time less than the signal propagation delay time of a semiconductor. This is problematic because electronic designs typically generate multiple clock phases from one or more gate delays (e.g., inverters). To overcome this limitation, some electronic designers resort to techniques such as interpolation to achieve the required clock edge spacing. However, these techniques do not achieve low power dissipation and are sensitive to device offsets. Accordingly, it is desirable to develop a data and clock recovery technique that results in low power dissipation and is less sensitive to device offsets.

SUMMARY OF THE INVENTION

A data receiver circuit includes a transmission line to generate the appropriate timing for clock and data recovery. The transmission line has at least two segments of predetermined lengths. To recover the clock and data, the transmission line receives a reference signal, and propagates the reference signal through the predetermined lengths of the transmission line. The transmission line is configured with a first tab to extract, from the first predetermined length, a first delayed signal and a second tab to extract, from the second predetermined length, a second delayed signal. A sampling circuit generates samples, at a first time period, from an input signal and the first delayed signal. The sampling circuit also generates samples, at a second time period, from the input signal and the second delayed signal. In this way, the sampling rate of the receiver circuit is based on the difference between the first and second predetermined lengths of the transmission line.

In one embodiment, the reference signal comprises a clock signal and the input signal comprises a serial data stream received from a serial communications link. In another embodiment, the reference signal comprises a serial data stream and the input signal comprises a clock signal. The receiver may also include a capacitance control device to adjust the capacitance, and hence the delay, of the transmission line. To accomplish this, a phase detector detects a phase difference between the reference signal at an input to the transmission line and the reference signal at an output of the transmission line. A filter receives the phase difference and generates a value in accordance with a loop filter parameter. The capacitance control adjusts the capacitance based on the filtered value.

In one embodiment, the data receiver circuit and the transmission line are both fabricated on an integrated circuit. In another embodiment, the transmission line is implemented external to the integrated circuit chip, such as on a package housing of the integrated circuit chip or on a printed circuit board for which the integrated circuit chip is mounted.

DETAILED DESCRIPTION

Figure 1:
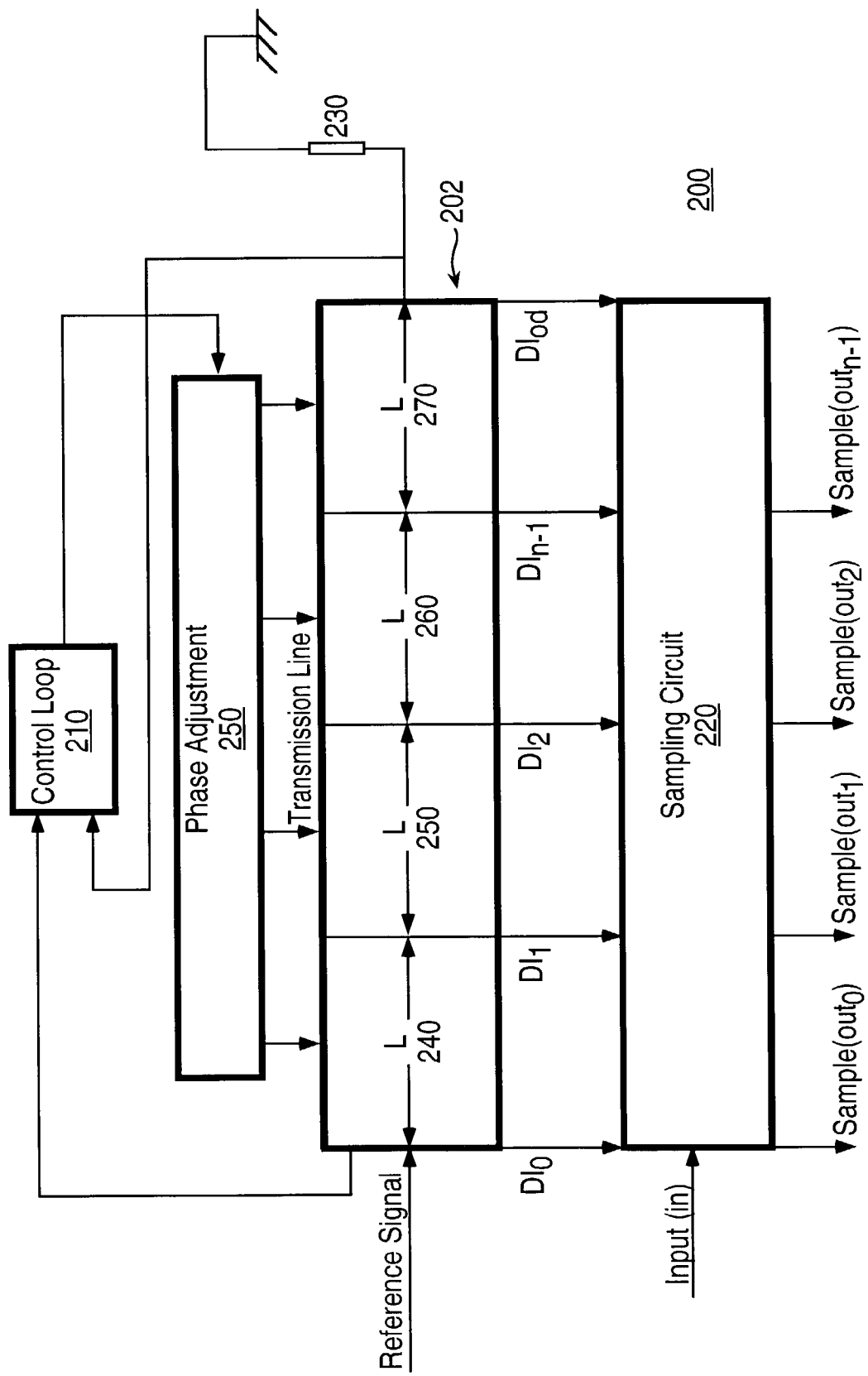
FIG. 1 is a block diagram illustrating one embodiment for the clock and data recovery circuit of the present invention.

The present invention uses a passive structure to generate signals to recover data and clock in high-speed serial communications links. FIG. 1 is a block diagram illustrating one embodiment for the clock and data recovery circuit of the present invention. The clock and data recovery circuit 200 utilizes a transmission line 202 to generate appropriate timing signals to sample the serial data bit streams at extremely high data rates. The transmission line, a passive device, propagates a signal to generate one or more delay signals.

Figure 2:
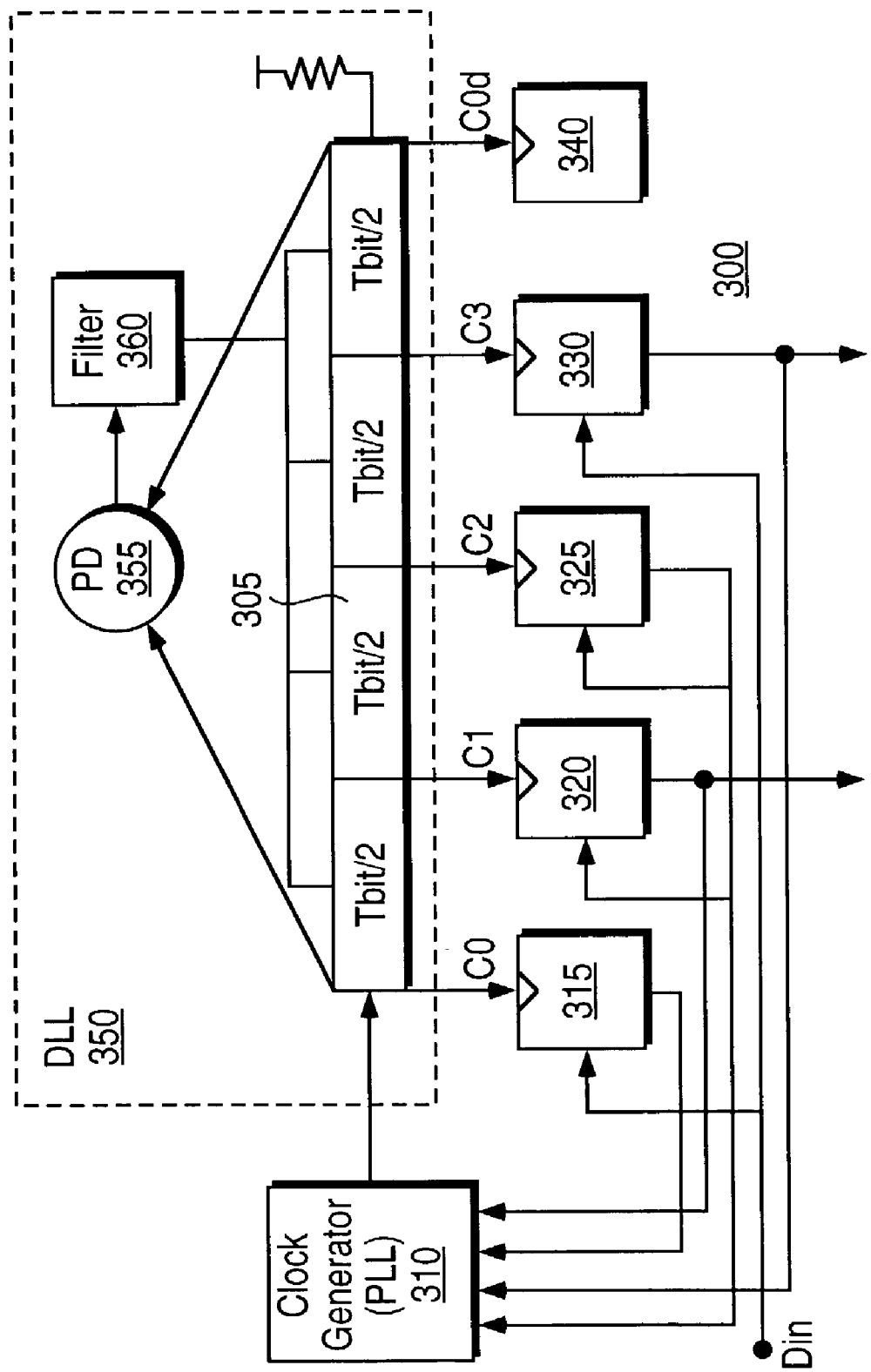
FIG. 2 is a block diagram illustrating one embodiment for a clock and data recovery system that delays the clock.
Figure 3:
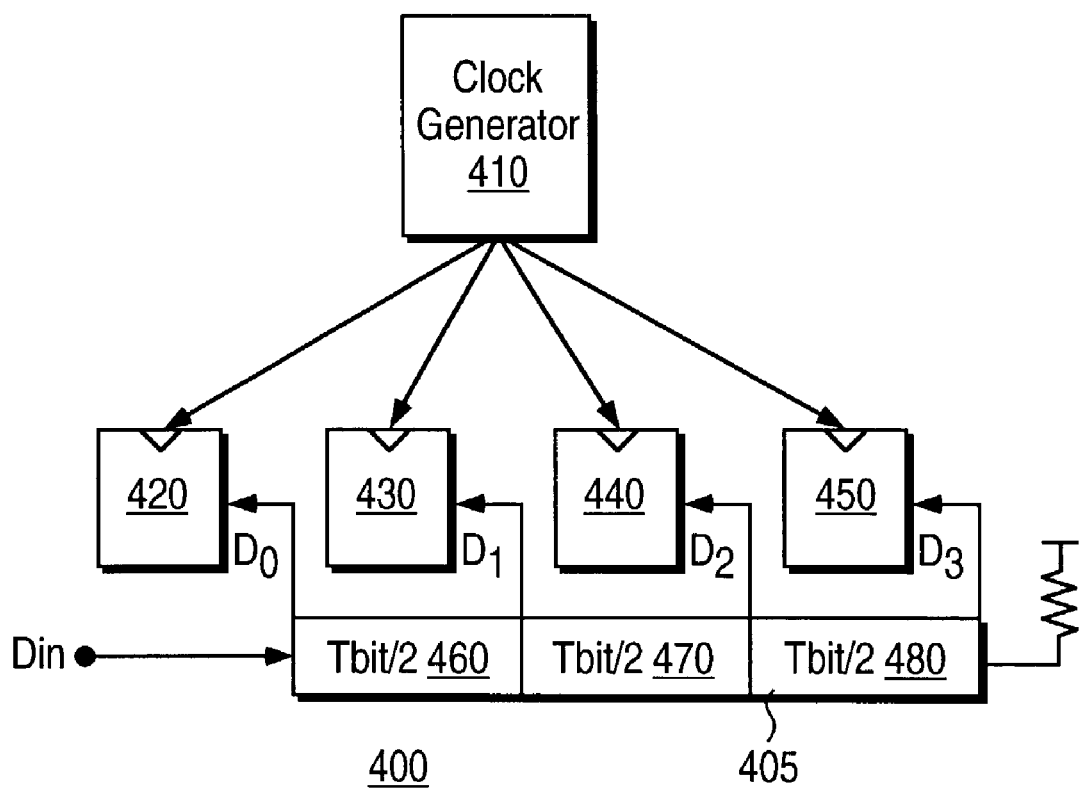
FIG. 3 is a block diagram illustrating a clock and data recovery circuit that delays the input data stream relative to a local clock.

The clock and data recovery circuit 200 samples a serial bit stream "n" times per cycle. The transmission line 202 may be configured to generate clock edges for any number of samples for each bit cycle. In one embodiment, the integer "n" is equal to four (i.e., the data is sampled two times for every bit cycle). For this embodiment, if the data rate of the serial link is equal to 40 giga bits per second, then the clock and data recovery circuit 200 samples every 12.5 pico seconds. As shown in FIG. 1, transmission line 202 receives, as input, a reference signal. As described more fully below, in one embodiment, the reference signal comprises a clock signal generated at the receiver (FIG. 2). In another embodiment, the reference signal comprises the input data stream (FIG. 3).

As shown in FIG. 1, transmission line 202 is divided into segments (e.g., 240, 250, 260 and 270). The length of each segment in FIG. 1 is depicted with the variable "L." For this example, the length, L, for each segment may be the same so as to generate "n" equally spaced signal edges. As shown in FIG. 1, transmission line 202 generates "n" delay signals from the reference signal. Specifically, the delay signals are extracted from transmission line 202 by generating tabs at the end of each segment. Accordingly, delay signal$_1$ (D1$_1$) is generated from propagating the reference signal through segment 240 of transmission line 202, delay signal$_2$ (D1$_2$) is generated from propagating the reference signal through segments 240 and 250, and delay signal$_{n-1}$ (D1$_{n-1}$) is generated from propagating reference signal through segments 240, 250 and 260. In addition, delay signal$_0$ (D1$_0$) is generated at the input of transmission line 202 (i.e., delay signal is equal to the reference signal). These signals (D1$_0$-D1$_{n-1}$) are generated to sample an input signal. Thus, the timing of the delay signals (D1$_0$-D1$_{n-1}$) is measured relative to the timing of the input signal. In one embodiment, an additional delay signal is generated at the termination of the transmission line 202, referenced as D1$_{0d}$ in FIG. 1. The transmission line 202 is terminated appropriately through resistor 230.

The "n" delay signals are input to a sampling circuit 220 as shown in FIG. 1. The sampling circuit 220 also receives an input signal. In one embodiment, n is equal to four, and the delay signals (D1$_0$-D1$_3$) are used to sample the input four times. Specifically, the input signal is sampled twice at the bit cycle transition points and twice at the centers of the bit cycle. The sampling circuit 220 generates, at each transition of a delay signal, a sample output (Sample(out$_0$)–Sample (out$_{n-1}$)). The receiver uses the samples to recover the clock and data from the serial bit stream. As is well-known, the samples taken around the bit cycle transition points are used to adjust the phase of a timing clock for the serial bit stream. The samples taken at the centers of the bit cycle are used to determine the value of the bits (i.e., samples below a predetermined threshold are assigned a "0" value, and samples above the predetermined threshold level are assigned a "1" value).

Process variations in manufacturing the transmission line may alter the desired delay response of the transmission line to result in a systematic phase offset. This phase offset degrades performance of the communication link. In one embodiment, the clock and data recovery circuit 200 provides a means to adjust or compensate for phase variations caused by the transmission line. For the embodiment of FIG. 1, clock and data recovery system 200 includes control loop 210 and phase adjustment 250. For this embodiment, control loop 210 receives, as input, delay signals extracted from the beginning and end of transmission line 202 (D1$_0$ and D1$_{0d}$). In general, control loop 210 measures the phase difference between the input and delay signals, and generates a value, either digital or analog, to control phase adjustment circuit 250. The phase adjustment circuit 250 adjusts the properties of transmission line 202 in accordance with the value received from control loop 210. In one embodiment, phase adjustment 250 adjusts the capacitance of transmission line 202. Embodiments for implementing control loop 210 and phase adjustment circuit 250 are described below in conjunction with FIGS. 6 and 7.

In one embodiment, the clock and data recovery system uses the transmission line to delay a clock locally generated at the receiver. FIG. 2 is a block diagram illustrating one embodiment for a clock and data recovery system that delays the clock. For this example, transmission line 305 is apportioned into four segments. Thus, for this example, four clock edges are generated to sample the data bit stream. As shown in FIG. 2, the length of each segment corresponds to one half times the transmission bit time (e.g., Tbit/2). The clock and data recovery circuit 300 includes a clock generator 310.

In one embodiment, the clock generator uses a phase lock loop ("PLL") to control the frequency and phase of the clock. The clock, output from clock generator 310, is input to transmission line 305. A first tab, C0, located at the start of transmission line 305, is coupled to a first sampling circuit. The first sampling circuit, D-Type flip-flop 315, is clocked by C0 to sample the input data. A second tab is coupled to transmission line 305 to generate a second clock, C1, delayed Tbit/2 from clock C0. Clock C1 is used to clock flip-flop 320.

Similarly, clocks C2 and C3 are generated from transmission line 305 at Tbit and 3Tbit/2, respectively. The clocks C2 and C3 are input to the clock input of flip-flop circuits 325 and 330 to sample the data in the bit stream at their respective clock edges. As shown in FIG. 2, the data bit stream, from the serial communications link, is input to each sampling circuit (e.g., flip-flops 315, 320, 325 and 330). The sampled data output of flip-flops 315 and 325 correspond approximately on the bit transitions, and the outputs of flip-flops 320 and 330 correspond to the data bits. These samples are input to clock generator 310. Using these samples, clock generator 310 determines any phase difference between transitions of the input data stream and clock transitions of the local clock. The phase lock loop is used to lock the phase of the local clock to the phase of the bit transitions in the input bit stream.

The embodiment of FIG. 2 includes a delay locked loop 350. In general, the delay lock loop locks the phase between the clock C0, input to transmission line 305, and the clock, C0d, output from transmission line 305. Specifically, clock signals C0 and C0d are input to phase detector 355. The phase detector 355 generates a value indicative of the phase difference between the clock signals, and inputs this value to the DLL loop filter 360. In turn, the loop filter 360 provides a loop response to the DLL (i.e., filters the value of the phase detector) for input to the phase adjustor (not shown).

The phase adjustor varies the capacitance of the transmission line 305 until the overall delay equals a time period of 2*Tbit. The capacitance adjustment may occur continuously through the loops shown in FIGS. 6 and 7. Alternatively, the phase adjustment may occur once when the integrated circuit chip is initially powered on. Adjusting the phase of the transmission line once at integrated circuit power up may be acceptable because the temperature variations will not affect the transmission line characteristics by an appreciable amount in most cases.

The use of a transmission line in a high-speed clock and data recovery circuit may be configured to delay the input data stream. FIG. 3 is a block diagram illustrating a clock and data recovery circuit that delays the input data stream relative to a local clock. For this example, the input data stream is sampled four times per bit cycle. The input data stream is input to transmission line 405. Similar to the embodiments of FIGS. 1 and 2, transmission line 405 is apportioned into segments that delay the input signal in increments of time corresponding to Tbit/2. Data D0 is extracted from the start of the transmission line 405. A second tab, configured after the first segment 460, generates data, D1. Similarly, the delayed data D2 and D3 are generated from segments 460 and 470 and from segments 460, 470 and 480, respectively. As shown in FIG. 3, the data (D0, D1, D2 and D3) are input to flip-flops 420, 430, 440 and 450, respectively. A clock generator 410 generates a local clock for input to sampling circuits (e.g., flip-flops 420, 430, 440 and 450). The sampled outputs of FIG. 3 may be used in the same manner as the sampled outputs of FIG. 2. Although FIG. 3 does not explicitly show that level of detail, it is assumed (similarly to FIG. 2) that the delay of the transmission line segments is adjusted through a PD and Filter.

Figure 4:
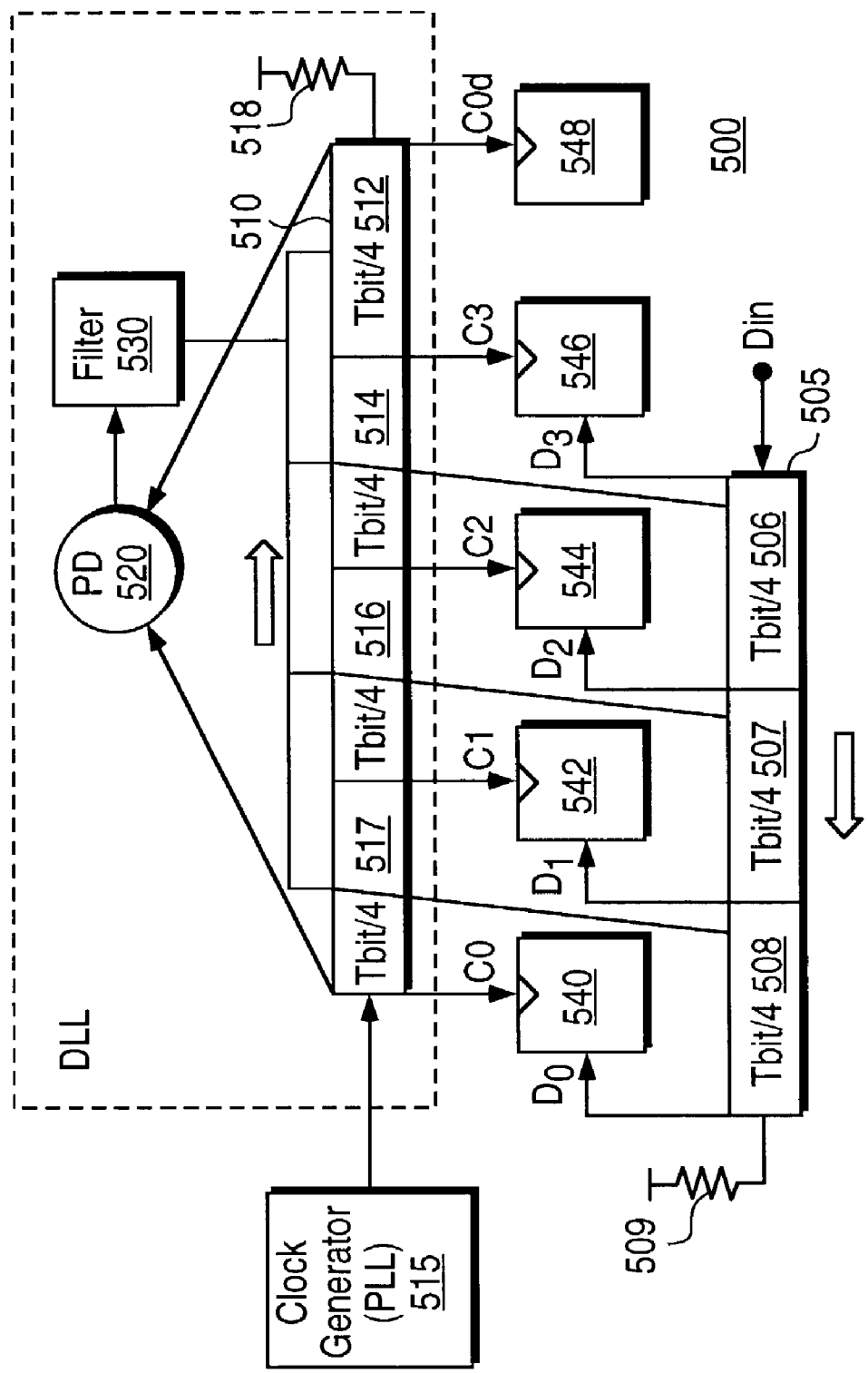
FIG. 4 is a block diagram illustrating one embodiment for a clock and data recovery system that shifts both the data and clock.

The clock and data recovery technique of the present invention may implement more than one transmission line to shift both clock and data. FIG. 4 is a block diagram illustrating one embodiment for a clock and data recovery system that shifts both the data and clock. The data recovery system 500 includes two transmission lines: transmission line 505 and transmission line 510. The transmission line 510 is coupled to clock generator 515 to generate the reference clocks at the receivers. The transmission line 510 is terminated through resistance 518. As shown in FIG. 4, transmission line 510 is divided into segments. Specifically, for this embodiment, transmission line 510 includes segments 512, 514, 516, and 517. The tabs of each segment of transmission line 510 are input to sampling circuits (540, 542, 544 and 546) to sample data at the clock transitions. The transmission line 505 receives, as its input, data from a serial bit stream. For this embodiment, transmission line 505 is divided into segments 506, 507 and 508. The serial data input to transmission line 505 is also the data input to sampling circuit 546. The sampling circuits 544, 542 and 540 receive, as data inputs, serial data extracted from segments 506, 507 and 508, respectively. The transmission line 505 is terminated through resistance 509 to provide proper impedance matching.

As shown in FIG. 4, each segment of transmission lines 505 and 510 delays a signal Tbit/4. Thus, similar to the embodiments of FIGS. 1, 2 and 3, the transmission lines of the embodiment of FIG. 4 provide relative timing shifts between clock and data twice per bit cycle (e.g., once at the transition and once in the center of the bit cycle). Note that each segment of transmission lines 505 and 510 shift clock and data Tbit/4, as opposed to Tbit/2, because both data and clock are delayed.

Clock and data recovery system 500 also includes a mechanism to compensate for phase offsets. Specifically, phase detector 520 receives the clock signal at both the beginning and end of transmission line 510. The measured phase offset is input to filter 530. The output of filter 530 is used to adjust the capacitance input to transmission line 510 and 505.

Figure 5:
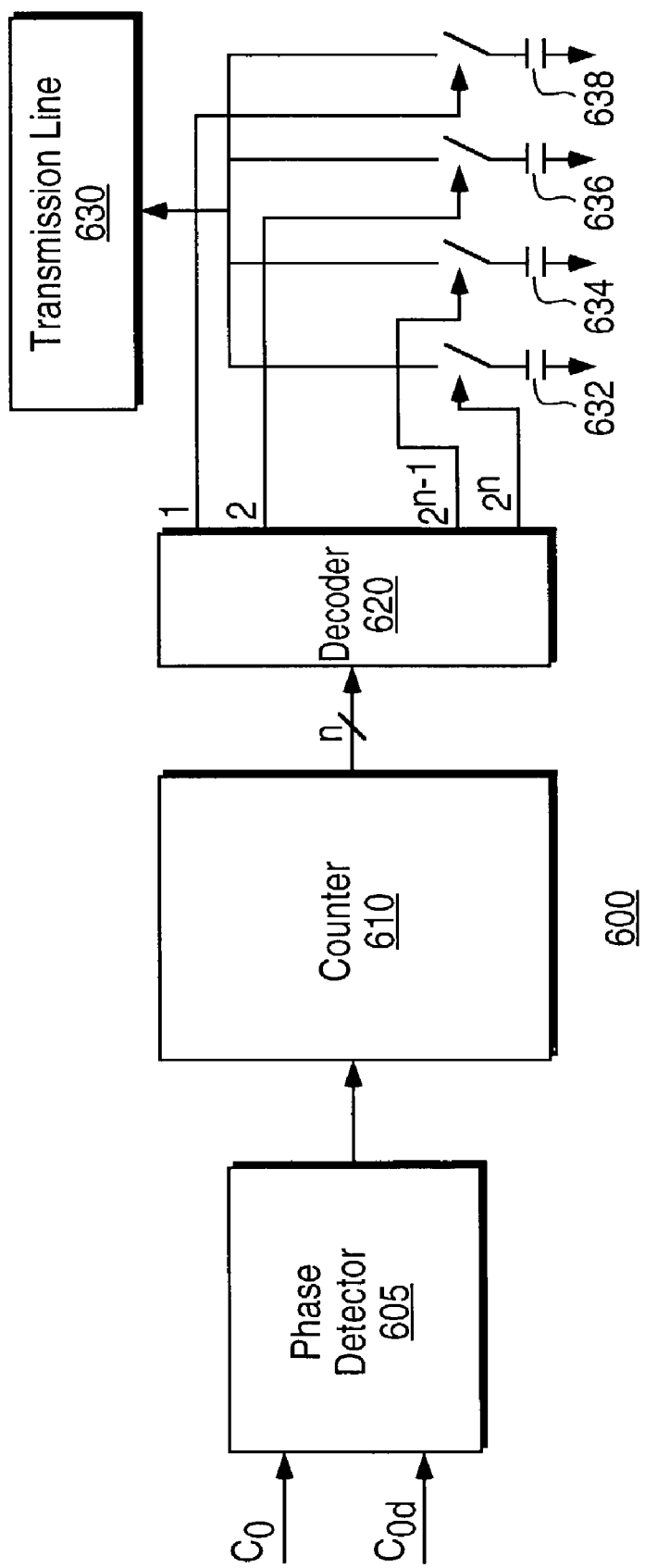
FIG. 5 is a block diagram illustrating one embodiment for a control loop and phase adjustment circuit for the clock and data recovery system.

FIG. 5 is a block diagram illustrating one embodiment for a control loop and phase adjustment circuit for the clock and data recovery system. In general, the delay lock loop measures the phase difference between a signal at the beginning of the transmission line and a signal at the end of the transmission line, and varies the capacitance at the transmission line, based on a filtered value of this phase difference, until the overall delay of the transmission line equals 2*Tbit. The example circuit of FIG. 5 illustrates one embodiment for a digital delay lock loop. Tabs from the start and end of a transmission line ($C_0$ and $C_{0d}$) are input to phase detector 605. In general, phase detector 605 measures the phase difference between $C_0$ and $C_{0d}$ to determine whether the phase of $C_0$ leads, lags or is in-phase with the phase of $C_{0d}$.

In one embodiment, phase detector 605 is implemented as a low set up time flip-flop. For this embodiment, $C_{0d}$ is the data input to the flip-flop, and $C_0$ is input to the clock. If the phase of the data input lags the phase of the clock, then the output of phase detector is a low logic level (e.g., "0"). Alternatively, if the phase of the data input leads the phase of the clock, then the output of the phase detector is a high logic level (e.g., "1"). The counter 610, which receives the output of phase detector 605, accumulates signals every cycle of the counter frequency. Thus, counter 610 counts up if the phase of $C_{0d}$ leads the phase of $C_0$. Alternatively, counter 610 counts down if the phase of $C_{0d}$ lags the phase of $C_0$. The counter frequency, which sets the loop response parameter, is an integer sub-multiple of the clock frequency, $C_0$. However, it is not required that the counter operates at the same frequency as $C_0$.

As shown in FIG. 5, the output of counter 610, an N bit value, is converted to "$2^n$" control lines through DECODER 620. Each control line is coupled to a switch, which in turn, couples a capacitor (632, 634, 636 or 638) to transmission line 630. By turning on and off the switches, the output of counter 610 effectively increases or decreases the capacitance per unit length of the transmission line segments. In one embodiment, the capacitors (632, 634, 636 and 638) are binary sized to ensure a linear delay transfer function. In one embodiment, the capacitors are implemented with metal insulator metal (MiM) capacitors. Thus, using this configuration, the delay of transmission line 630 is increased if $C_{0d}$ leads $C_0$, and is decreased if $C_{0d}$ lags $C_0$. The feedback loop closed at the phase detector ensures that the average phase of $C_0$ is the same as the average phase of $C_{0d}$ with the exception of some "dithering." This dithering determines the minimum capacitor size selected. In another embodiment, the delay lock loop further includes a binary to thermometer code detector to convert the N bit counter output to $2^N$ control lines that control $2^N$ identical capacitors. This alternative embodiment has the advantage of exhibiting lower transient delay variations.

Figure 6:
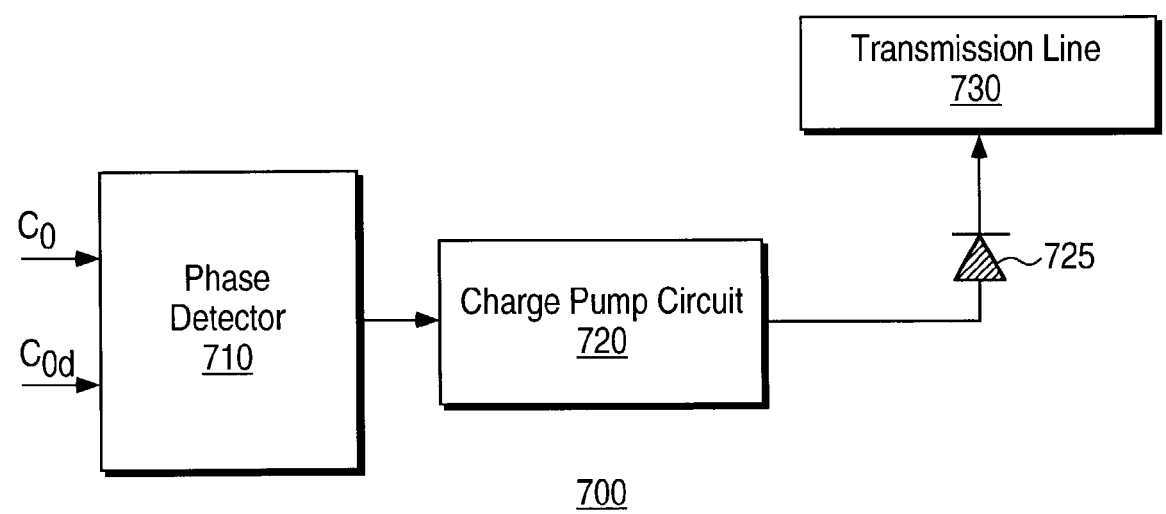
FIG. 6 is a block diagram illustrating another embodiment for implementing a delay lock loop for use with a transmission line.

In another embodiment, the delay lock loop may be implemented using analog components. FIG. 6 is a block diagram illustrating another embodiment for implementing a delay lock loop for use with a transmission line. For this embodiment, phase detector 710 generates a voltage indicative of the phase difference between $C_0$ and $C_{0d}$. The filter for the delay lock loop implementation of FIG. 6 comprises the charge pump circuit 720. For this embodiment, the charge pump circuit 720 is coupled to the control voltage of a varactor (e.g., either PN junction or MOSFET). The varactor 725, coupled to transmission line 730, induces capacitance on transmission line 730. As is well-known, when a voltage is applied to a PN junction to reverse bias the junction, the holes in the p-region are attracted to the anode terminal and the electrons in the n-region are attracted to the cathode terminal. This region, the depletion region, is essentially devoid of carriers, and thus behaves as a dielectric of a capacitor.

The loop bandwidth of the delay lock loop is selected to be at least a factor of 10 from the loop bandwidth of the phase lock loop of the local clock generator. This difference in the respective loop bandwidths avoids interactions between the phase lock loop and the delay lock loop. The delay variations of the transmission line are fairly small resulting in a very small DLL open loop gain. In one embodiment, the delay lock loop operates continuously. In another embodiment, the delay lock loop may be calibrated only a single time at system power-up. The onetime calibration embodiment isolates the DLL from the PLL because, during initial power-up, the local oscillator PLL is still locked to a local clock reference that is typically only a few parts per million ("ppm") different from the transmitted data.

Figure 7A:
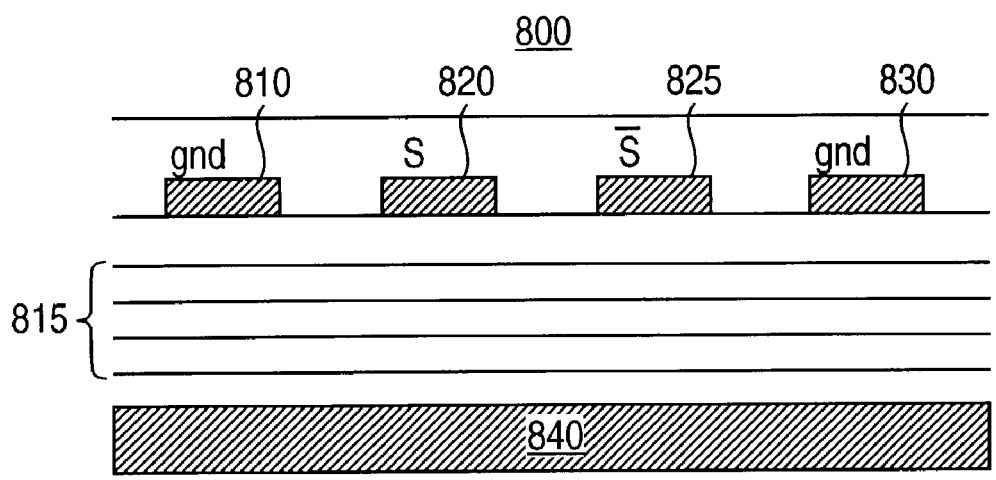
FIG. 7*a* illustrates a cross-section of an integrated circuit that implements an on-chip differential transmission line.
Figure 7B:
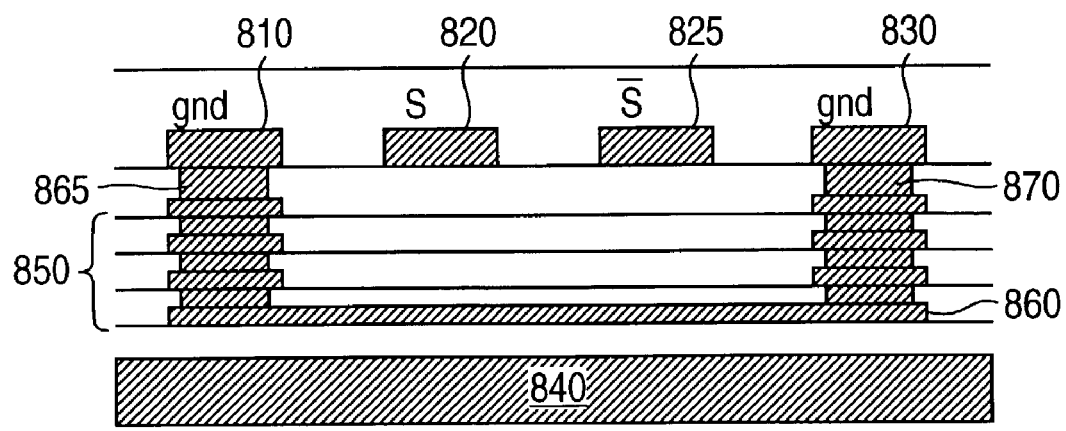
FIG. 7*b* illustrates a cross-section of an integrated circuit for an on-chip differential transmission line that includes shielding.

The transmission line for the clock and data recovery circuit may be implemented either directly on an integrated circuit chip or off the integrated circuit chip. FIGS. 7a and b illustrate embodiments for implementing the transmission lines directly on an integrated circuit chip. In one embodiment, for the on-chip implementation, the transmission line is implemented as a coplanar waveguide. The transmission line may be either differential or single ended. FIG. 7a illustrates a cross-section of an integrated circuit that implements a differential transmission line. An integrated circuit 800 includes a semiconductor substrate 840. Deposed on top of the semiconductor substrate 840 is a plurality of dielectric layers, labeled 815 on FIG. 7a. For this embodiment, the differential coplanar waveguide is implemented on the top metal layer with ground conductors 810 and 830, signal conductor 820, and negative signal conductor 825. In typical semiconductor processing, which utilizes copper interconnect lines, the transmission line may be implemented at the top metal layer so as to minimize loss from the semiconductor substrate. Although the conductors of the waveguide of FIGS. 7a and 7b are shown in a differential configuration, a single ended waveguide, with only a signal and ground conductors, may be used.

In another embodiment, an on-chip transmission line may be shielded from the semiconductor substrate. FIG. 7b illustrates a cross-section of an integrated circuit for an on-chip differential transmission line that includes shielding. As shown in FIG. 7b, the metal layers 850 include a metal shield 860 at the lowest metal layer. The shield 860 is coupled to the ground conductors of the waveguide through vias and interconnects 865 and 870. The shield 860 shields the electromagnetic energy from penetrating from the waveguide into the lossy semiconductor substrate 840. For example, for an eight (8) metal layer process with copper interconnect lines, the differential coplanar waveguide as shown in FIG. 7b, with nine micrometer by three micrometer top layer traces separated by nine micrometers, exhibits an attenuation coefficient of approximately 0.4 Neper/cm at 20 gigahertz. This attenuation amounts to approximately 30 percent signal loss per 60 pico second delay. This amount of delay is more than 1.5*Tbit at 40 Gps, which is sufficient for certain applications. Although some signal attenuation is inevitable at such high data rates, the use of shielding reduces the loss if the substrate is lossy.

Figure 8:
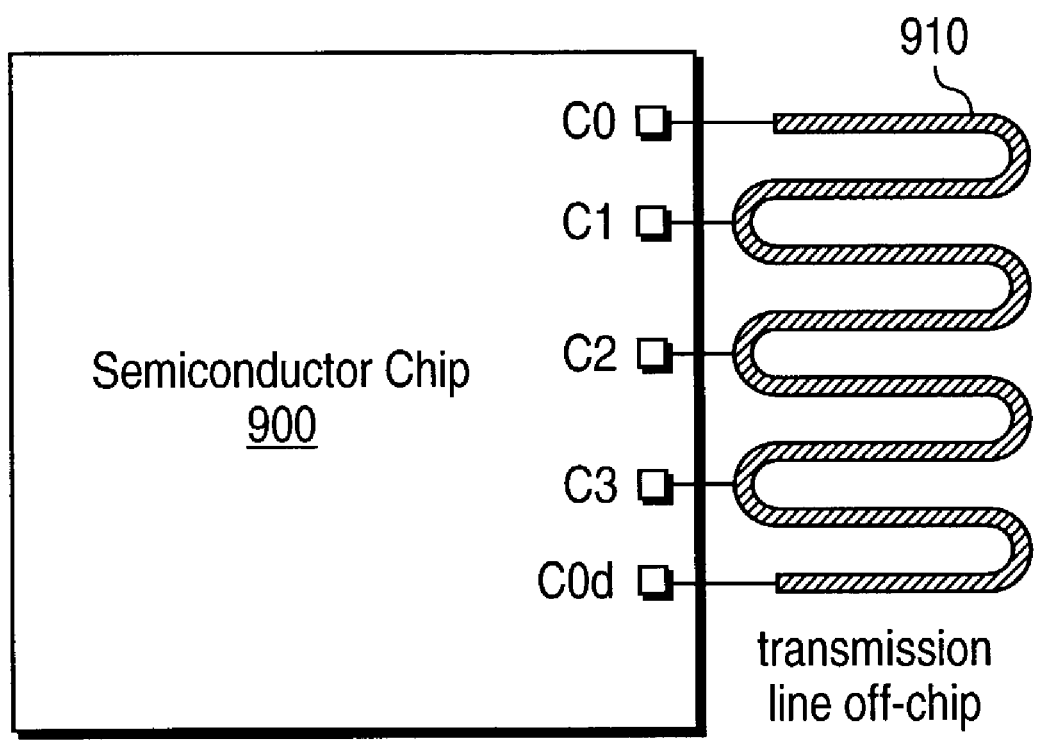
FIG. 8 illustrates one embodiment for implementing the transmission lines for clock and data recovery circuit off the integrated circuit chip.

FIG. 8 illustrates one embodiment for implementing the transmission lines for clock and data recovery circuit off the integrated circuit chip. The geometry of transmission line 910 illustrates one possible configuration for a single ended transmission line on the package of the integrated circuit. The transmission line may be implemented on the integrated circuit package or on a printed circuit board for which the clock and data recovery circuit is mounted. For this embodiment, the data and recovery circuit includes four sample clocks (e.g., "n" equals four). As shown in FIG. 8, an integrated circuit 900 includes a $C_0$ pin to couple the reference clock to the transmission line 910. Additional clocks, generated from delay of transmission line 910, are extracted at pins $C_1$, $C_2$, and $C_3$. As described above, $C_{0d}$ is used in conjunction with $C_0$ to compensate for phase offsets in transmission line 910.

The off chip implementation of transmission line 910 allows for much thicker metalization than metalization that may be achieved on-chip. In addition, attenuation may be significantly reduced if the package substrate consists of a low loss dielectric.

Although the present invention has been described in terms of specific exemplary embodiments, it will be appreciated that various modifications and alterations might be made by those skilled in the art without departing from the spirit and scope of the invention.

What is claimed is:

1. A data receiver circuit comprising:
a transmission line comprising a plurality of segments of predetermined lengths, said transmission line to receive a reference signal and to propagate said reference signal for the predetermined lengths, said transmission line further comprising:
a first tab to extract, from a first segment of said transmission line, a first delayed signal and;
a second tab to extract, from a second segment of said transmission line, a second delayed signal, wherein each tab is situated at the end of each segment of said transmission line;
a sampling circuit, coupled to said transmission line, to receive a serial bit stream and to generate samples of said serial bit stream at times specified by said first delayed signal and at times specified by said second delayed signal, wherein a sampling rate is based on said predetermined lengths of the first and second segments of said transmission line;
a phase detector to detect a phase difference between said reference signal at an input to said transmission line and said reference signal at an output of said transmission line;
a filter, coupled to said phase detector, to receive said phase difference and to generate a value in accordance with a loop filter parameter; and
a capacitance control device, coupled to said transmission line and coupled to receive said value, to adjust the capacitance of said transmission line.

2. The circuit as set forth in claim 1, wherein said reference signal comprises a clock signal.

3. The circuit as set forth in claim 1, wherein said phase detector, filter and capacitance control device operate continuously in a digital delay lock loop.

4. The circuit as set forth in claim 1, wherein said phase detector, filter and capacitance control device operate only at circuit power-up to adjust the capacitance of said transmission line.

5. The circuit as set forth in claim 1, further comprising an integrated circuit chip comprising said data receiver circuit and said transmission line.

6. The circuit as set forth in claim 1, wherein said sampling circuit comprises an integrated circuit chip, and said transmission line is implemented external to said integrated circuit chip.

7. The circuit as set forth in claim 6, wherein said transmission line is implemented on a package housing of said integrated circuit chip.

8. The circuit as set forth in claim 6, wherein said transmission line is implemented on a printed circuit board on which said integrated circuit chip is mounted.

9. A method for recovering a clock and serial bit stream at a receiver, said method comprising the steps of:
receiving a reference signal;
propagating said reference signal over a transmission line;

extracting, from a first segment of a predetermined length of said transmission line, a first delayed signal;

extracting, from a second segment of a predetermined length of said transmission line, a second delayed signal;

receiving a serial bit stream;

generating samples of said serial bit stream at times specified by said first delayed signal;

generating samples of said serial bit stream at times specified by said second delayed signal, wherein a sampling rate is based on said predetermined lengths of the first and second segments of said transmission lines;

detecting a phase difference between said reference signal at an input to said transmission line and said reference signal at an output of said transmission line;

generating a value for said phase difference in accordance with a loop filter parameter; and adjusting the capacitance of said transmission line in accordance with said value.

10. The method as set forth in claim 9, wherein said reference signal comprises the clock signal.

11. The method as set forth in claim 9, wherein the steps of detecting a phase difference, generating a value for said phase difference, and adjusting the capacitance of said transmission line are performed continuously in a digital delay lock loop.

12. The method as set forth in claim 9, wherein the steps of detecting a phase difference, generating a value for said phase difference, and adjusting the capacitance of said transmission line are performed only at circuit power-up to adjust the capacitance of said transmission line.

13. The method as set forth in claim 9, further comprising the step of fabricating said receiver and said transmission line on an integrated circuit chip.

14. The method as set forth in claim 9, further comprising the steps of:

fabricating said receiver on an integrated circuit chip; and fabricating said transmission line external to said integrated circuit chip.

15. The method as set forth in claim 14, wherein the step of fabricating said transmission line external to said integrated circuit chip comprises the step of fabricating said transmission line on a package housing of said integrated circuit chip.

16. The method as set forth in claim 14, wherein the step of fabricating said transmission line external to said integrated circuit chip comprises the step of fabricating said transmission line on a printed circuit board for which said integrated circuit chip is mounted.

\* \* \* \* \*